United States Patent [19]
Roach et al.

[11] Patent Number: 5,367,569
[45] Date of Patent: * Nov. 22, 1994

[54] NETWORK INTERFACE MODULES

[75] Inventors: James A. Roach, Altamonte Springs, Fla.; James D. Chermak, Commack, N.Y.; Emanuel J. Pagliuca, Patchogue, N.Y.; Thomas J. Smith, Bay Shore, N.Y.

[73] Assignee: Tll Industries, Inc., Copiague, N.Y.

[ * ] Notice: The portion of the term of this patent subsequent to Feb. 22, 2011 has been disclaimed.

[21] Appl. No.: 684,974

[22] Filed: Apr. 15, 1991

[51] Int. Cl.$^5$ .............................................. H04M 9/00
[52] U.S. Cl. .................................... 379/412; 379/399; 361/119
[58] Field of Search ....................... 379/399, 412, 413; 361/119, 56

[56] References Cited
U.S. PATENT DOCUMENTS

| | | | |
|---|---|---|---|
| 4,827,502 | 5/1989 | Suffi et al. | 361/119 X |
| 4,853,960 | 8/1989 | Smith | 379/412 X |
| 4,905,119 | 2/1990 | Webb | 379/412 X |
| 4,910,770 | 3/1990 | Collins et al. | 379/412 X |
| 4,941,063 | 7/1990 | McCartney et al. | 361/119 |
| 4,949,376 | 8/1990 | Nieves et al. | 379/412 X |
| 5,175,662 | 12/1992 | Debalko et al. | 379/412 X |

OTHER PUBLICATIONS

Keptel SNI-5000—Network Interface System.
Keptel ML-5 An Interface System for Today . . . and Tomorrow.
Keptel SNI 1500—Indoor Network Interface.

*Primary Examiner*—James L. Dwyer
*Assistant Examiner*—Paul A. Fournier
*Attorney, Agent, or Firm*—Sachs & Sachs

[57] ABSTRACT

A network interface module for providing connection between a customer's equipment and the telephone company owned portion of the customer loop is provided with a miniaturized easily removable module which includes the overvoltage protection device and the circuitry necessary to provide a prescribed line test termination impedance having a particular characteristic signature to the telephone central office when a continuity test is made on a subscriber line.

11 Claims, 2 Drawing Sheets

NETWORK INTERFACE MODULES

BACKGROUND OF THE INVENTION

1. Field of the Invention

The present invention relates to network interface apparatuses, and in particular to a network interface module that includes overvoltage protection and termination impedance, having a characteristic signature, all in one readily removable module.

2. Discussion of the Relevant Art

An individual homeowner at present may purchase and install his or her own telephone equipment and related appliances. The homeowner is responsible for the proper operation of the equipment that he has installed. The telephone company may not own the equipment in a subscriber's home and therefore will be responsible only for proper service up to the juncture between the telephone lines and the homeowner's premises. Thus, it is necessary to provide a telephone interface apparatus which is capable of readily disconnecting the homeowner's wiring, installed in the premises, from the telephone company's transmission lines so that when trouble occurs, it could readily be isolated to the telephone company's line or the homeowner's house wiring. If a homeowner experiences a problem with his telephone service it is first necessary for him to determine if it is the telephone company's fault and repairs are needed on their lines or equipment or if the wiring or equipment the homeowner installed requires repairs. Many devices are now available that provide the function of readily disconnecting the home wiring from the telephone company owned portion of the subscriber loop. Typical of these apparatuses is U.S. Pat. No. 4,910,770 issued to Collins, et al on Mar. 20, 1990; U.S. Pat. No. 4,488,008 issued to T. A. Dellinger, et al on Dec. 11, 1984; U.S. Pat. No. Des. 287,583 issued to T. J. Smith, et al on Jan. 6, 1987, and U.S. Pat. No. 4,624,514 issued to Smith on Nov. 25, 1986.

These devices, although providing the necessary function of severing the telephone company owned portion of the customer loop from the homeowner's portion of the customer loop are either inconvenient and/or capable of handling only a single loop. The instant invention provides a simple convenient means to provide similar functions for a plurality of telephone lines and is readily exchangeable with other modules presently in use and includes therein overvoltage protection, as well as, identifying signature impedance across the customer line for interrogation by the telephone office. The module is readily replaceable with a minimum of wiring disconnects required.

SUMMARY OF THE INVENTION

It is an object of the present invention to provide a network interface module suitable for replacement of existing modules that include overvoltage protection therein as well as a specific terminating impedance for the telephone line at the juncture where the customer loop becomes the property of the homeowner (subscriber). The remaining portion of the loop remains the property of the telephone company.

It is another object of the present invention to provide a telephone network interface module capable of containing within its housing the necessary electronic components needed by the telephone company at the juncture of the homeowner's premises and the telephone company's transmission lines.

It is still yet another object of the present invention to provide a telephone network interface module where the homeowner (subscriber) may connect his internal house wiring and auxiliary equipment and may readily disconnect it from the telephone company portion of the customer's loop for isolation purposes.

It is still yet another object of the present invention to provide a telephone network interface module having the above features and be suitable for use with multiple subscriber telephone network interface housings.

It is still yet another object of the present invention to provide a completely sealed telephone network interface module which may readily be repaired by the telephone company service people or disposed of and replaced.

A network interface module for providing connection between a customer's equipment loop termination and the telephone company owned portion of the customer loop, according to the principles of the present invention comprises: an elongated housing having a closed top surface with a socket means disposed thereon and an open bottom. A first group of terminals are removably received at one end of the top surface of the housing and is adapted to be connected to the customer's equipment and has a cable with a plug disposed thereon on one end, the other end is connected to the first group of terminals. The cable plug is adapted to receive and cooperate with the housing socket. A second set of terminals, at least two, is disposed at the opposite end of the top surface and is adapted to be connected to the telephone company owned portion of the customer loop and an overvoltage protection circuit arrangement is disposed within the housing and has one terminal connected to the ground and one terminal connected to each of the two terminals connected to telephone company owned portion of the customer loop. A circuit board disposed within the housing is adapted to be connected to the housing socket and the second group of terminals and includes line termination impedance circuitry. The housing also may include a removable cover to cover the first set of terminals, the housing socket and the mated cable plug. The housing may also be provided with an extending tab at one end and a retaining ground terminal screw suitable for cooperating with a lip and threaded receptacle provided in a network interface housing for readily removing and retaining the module in the network interface housing.

The foregoing and other objects and advantages will appear from the description to follow. In the description reference is made to the accompanying drawing which forms a part hereof, and in which is shown by way of illustration two specific embodiments in which the invention may be practiced. These embodiments will be described in sufficient detail to enable those skilled in the art to practice the invention, with like numerals being used for similar parts in both embodiments, and it is to be understood that other embodiments may be utilized and structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawing in which.

DESCRIPTION OF THE PREFERRED EMBODIMENTS

Figure 1:
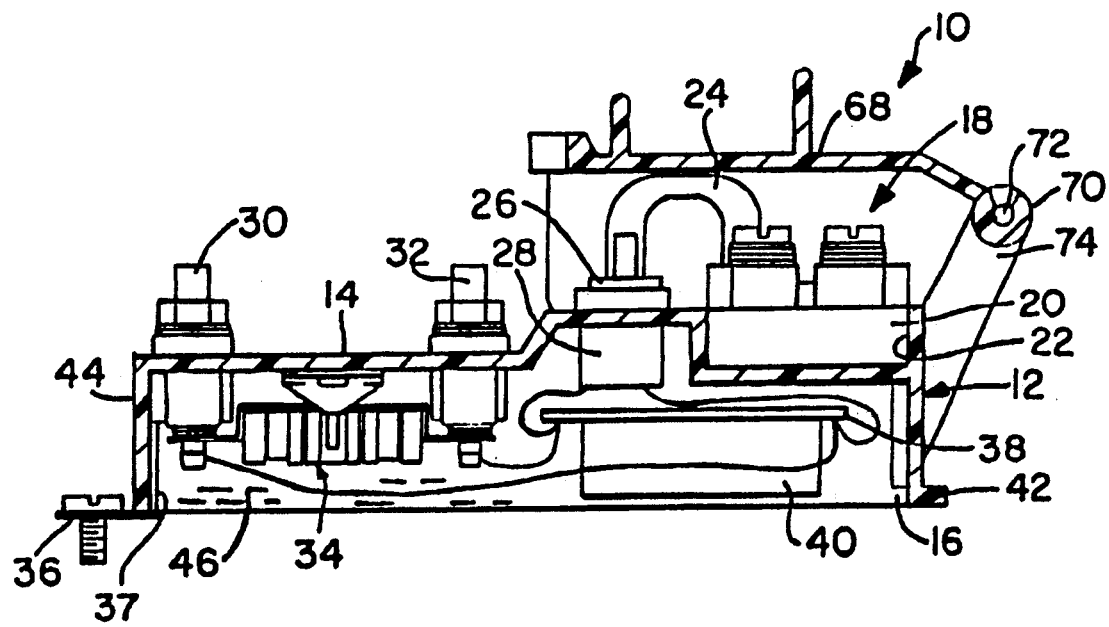
FIG. 1 is a side view in elevation of a telephone network interface module with its cover closed, according to the principles of the present invention.
Figure 2:
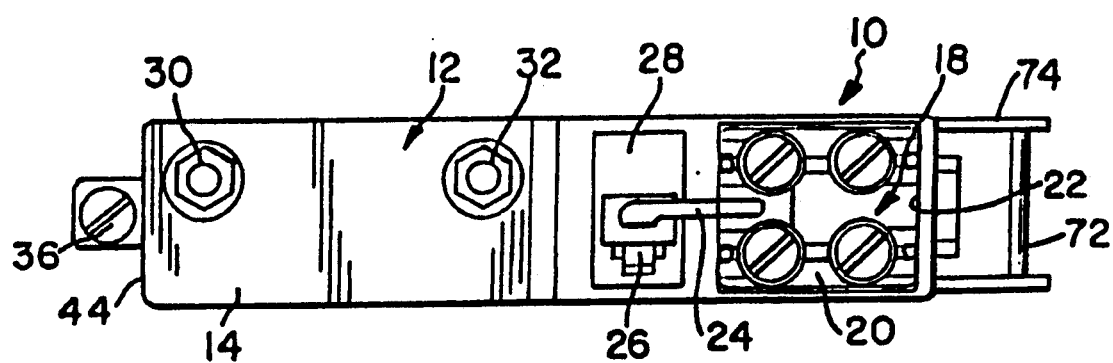
FIG. 2 is a top plan view of the apparatus shown in FIG. 1 with the cover removed.

Referring now to the figures, and in particular, to FIGS. 1 and 2, there is shown a telephone network interface module 10, according to the principles of the present invention, that includes a housing 12 which has a closed top surface 14 and an open bottom 16. A plurality of terminals 18 are housed in a miniature insulated assembly 20. The assembly 20 is adapted to be received into a receptacle portion 22 provided in the top surface 14 of the housing 12. Assembly 12 is also provided with a cable 24 having wires, not shown, connected to each of the terminals 18 at one end and a conventional male telephone plug 26 (commonly known as an RJ 11) on the other end which is adapted and received into a conventional telephone socket 28 provided on the top surface 14 of the module 12 positioned between the plurality of terminals 18 and a pair of line terminals 30 and 32 which are adapted to be connected to the telephone company portion of the customer loop.

Connected across the terminals 30 and 32 is an overvoltage protection assembly 34 (see FIGS. 3 and 4) which is connected across the terminals 30 and 32 and ground terminal 36.

Figure 3:
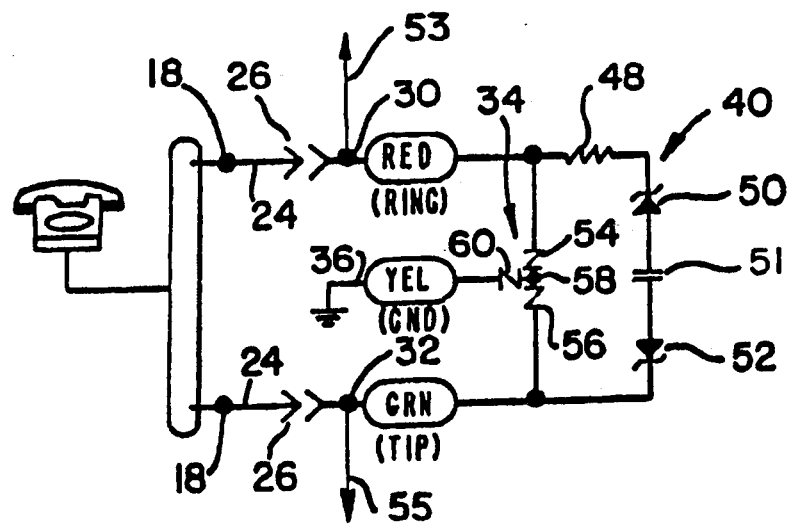
FIG. 3 is a circuit schematic diagram of one embodiment of the line termination impedance means with overvoltage protection.
Figure 4:
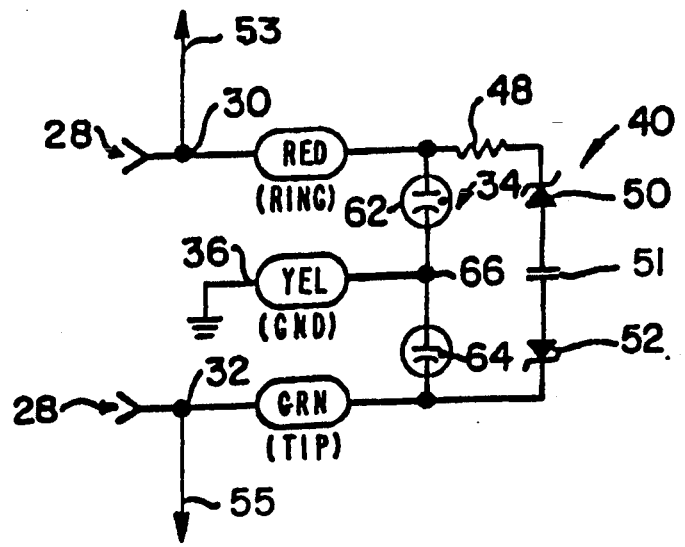
FIG. 4 is a circuit schematic diagram of a line termination impedance means with alternative overvoltage protection.

A printed circuit board 38 is mounted within the hollow housing 14, in a conventional manner, and includes thereon the necessary circuit components as shown in FIGS. 3 and 4 to provide the line termination circuitry 40, which will be explained in detail in connection with FIGS. 3 and 4.

The housing 14 is also provided with an extending portion 42 adapted to be received by a lip, provided in a network interface housing, not shown. The other end 44 of the housing 14 is provided with the ground terminal 36, preferably a screw and tab 37, which is adapted to be received into a threaded aperture provided in a network interface housing, not shown.

The hollow housing 12 may be filled with conventional potting material 46, via the open bottom 16 completely sealing the module 10.

FIG. 3 shows the schematic circuit diagram of the line termination impedance circuitry 40, which is mounted on the printed circuit board 38, in a conventional manner. The circuitry 40 includes a resistor 48, preferably having a value of 15,000 ohms, two zener diodes 50 and 52, preferably have a breakover voltage of 4.3 volts and a capacitor 51, preferably 0.47 μfd, all connected in a series current carrying path across the lower portion of the telephone company line terminals 30 and 32, shown at arrows 53 and 55, respectively.

The resistor 48, diode 50 and diode 52 are connected in a serial path between terminals 30 and 32 with the cathode of the zener (breakover diode) being connected to one end of the resistor 48 with the other end of the resistor 48 being connected to terminal 30. The cathode of zener diode 52 is connected to terminal 32 and capacitor 51 is connected between the anode of zener diode 50 and the anode of zener diode 52.

The overvoltage protection circuitry module 34 in the embodiment shown in FIG. 3, consists of 3 SIDAC units connected as follows: 2 units are serially connected across terminals 30 and 32 with the juncture 58 of the SIDACS 54 and 56 being connected to ground terminal 36, via a SIDAC 60. The SIDAC's breakover voltage is approximately 150 volts and may be obtained as Part No. P3403AB manufactured by the Teccor Corp., Dallas, Tex.

In the embodiment shown in FIG. 4 the overvoltage protection assembly 34 includes two gas tubes 62 and 64 with their juncture 66 connected directly to the ground terminal 36 and may be purchased as Part No. TII 71B, from TII Industries, Inc., Copiague, N.Y., which is a three electrode gas tube, or its solid state equivalent.

The line terminating impedance provided by the circuit arrangement 40 allows the telephone company to monitor the impedance across the line, whether or not the customer has a telephone connected to the line, with a proper interrogating signal.

The circuit board may also have mounted thereon a half ringer circuit arrangement, not shown. Resistor 48 and capacitor 54 are chosen to provide twice the impedance of a typical telephone ringer. By varying the voltage of the measurement signal above and below the threshold of the zener diodes 50 and 52 the telephone central office can determine if this device is present on the line. The SIDAC assembly 54, 56 and 60 may be included in a single module and provides solid state surge protection for the telephone line.

A resilient cover 68 may be removably affixed to the housing 12 by means of a C-shaped portion 70 provided on one end of the cover 68 that is adapted to receive a bar 72 connecting the extension arms 74 provided on the housing 14. The resilient protective cover 68 is provided as to prevent the customer from casual contact with electrically live contacts before the plug 26 is removed, thus disconnecting the circuit, for testing purposes.

In operation the network interface module may be readily replaced in a telephone interface assembly housing by removing a single screw, tilting the unit out of the box. The telephone company wires attached to terminals 30 and 32 and customer wires attached to terminals 18 may be removed and then returned to the new module when it is installed. It is also within the contemplation of the present invention to include sealed terminals for terminals 18, 30 and 32 so that they may be readily terminated and or returned to their proper position upon replacement of the module 10.

Hereinbefore has been disclosed a replaceable interface module which includes overvoltage protection, as well as, line termination impedance having a prescribed signature in a miniature module. It will be understood that various changes in the details, materials, arrangement of parts and operating conditions which have been herein described and illustrated in order to explain the nature of the invention may be made by those skilled in the art within the principles and scope of the instant invention.

Having thus set forth the nature of the invention, what is claimed is:

1. An independently removably and replaceable network interface module contained within an elongated hollow housing for providing connections between a customer's equipment and the telephone company owned portion of a customer loop comprising:
A. said elongated hollow housing having;
 a) a closed top surface having a socket means disposed thereon and an open bottom, and
 b) first terminal means removably received at one end of said top surface adapted to be connected to said customer's equipment, and having;
 c) cable means having a plug means disposed on one end thereof, the other end of said cable means being connected to said first terminal means, said cable plug means being adapted to be received into and cooperate with said housing socket means;
B. second terminal means having at least two terminals disposed at the opposite end of said top surface adapted to be connected to said telephone company owned portion of said customer loop;
C. overvoltage protection means disposed within said housing, said protection means having one terminal connected to a ground means and one terminal connected to each of said two terminals of said telephone company owned portion of said customer loop; and
D. circuit board means disposed within said housing, said circuit board means being adapted to be connected to said housing socket means and said second terminal means.

2. A network interface module according to claim 1 further including line termination impedance means disposed on said circuit board means.

3. A network interface module according to claim 1 wherein said housing further includes cover means removably affixed to said one end of said top surface for covering said first terminal means, said housing socket means, and said mated cable means plug means.

4. A network interface module according to claim 1 wherein said housing includes extending tab means disposed at one end for cooperating with a lip means provided in a network interface housing and mounting means for removably retaining said module in said housing.

5. A network interface module according to claim 1 wherein said overvoltage protection means includes a gas filled three terminal device with one terminal being connected to ground and each of the other terminals being connected to one of said two terminals of said second terminal means.

6. A network interface module for providing connections between a customer's equipment and the telephone company owned portion of said customer loop comprising:
A. an elongated hollow housing having;
 a) a closed top surface having a socket means disposed thereon and an open bottom, and
 b) first terminal means removably received at one end of said top surface adapted to be connected to said customer's equipment, and having,
 c) cable means having a plug means disposed on one end thereof, the other end of said cable means being connected to said first terminal means, said cable plug means being adapted to be received into and cooperate with said housing socket means;
 d) cover means removably affixed to said one end of said top surface for covering said first terminal means, said housing socket means, and said mated cable means plug means; and
 e) extending tab means disposed at one end for cooperating with a lip means provided in a network interface housing and mounting means for removably retaining said module in said housing;
B. second terminal means having at least two terminals disposed at the opposite end of said top surface adapted to be connected to said telephone company owned portion of said customer loop;
C. overvoltage protection means disposed within said housing, said protection means having one terminal connected to a ground means and one terminal connected to each of said two terminals of said telephone company owned portion of said customer loop; and
D. circuit board means disposed within said housing, said circuit board means being adapted to be connected to said housing socket means and said second terminal means and including a line termination impedance means, said line termination means providing a series current path comprising:
 i) a resistor having one end thereof connected to one terminal of said second terminal means,
 ii) a first zener diode having a cathode and an anode said cathode being connected to the other end of said resistor,
 iii) a second zener diode having an anode and a cathode, said cathode being connected to the other terminal of said second terminal means, and
 iv) a capacitor, said capacitor having one end connected to the anode of said first zener diode and the other end being connected to the anode of said second zener diode.

7. A telephone line termination impedance means for providing a characteristic signature to the central office when a continuity test is made on a customer line terminating at an interface having a pair of terminals, said impedance means providing a series current path therebetween comprising:
 a) a resistor having one end thereof connected to one terminal of said second terminal means,
 b) a first zener diode having a cathode and an anode said cathode being connected to the other end of said resistor,
 c) a second zener diode having an anode and a cathode, said cathode being connected to the other terminal of said second terminal means, and
 d) a capacitor, said capacitor having one end connected to the anode of said first zener diode and the other end being connected to the anode of said second zener diode.

8. A telephone line termination impedance means according to claim 7 wherein said first and second zener diodes have a breakover voltage of approximately 4.3 volts, said resistor is approximately 15,000 ohms and said capacitor is 0.33 $\mu$fd or greater.

9. A network interface module according to claim 6 wherein said overvoltage protection means includes a a gas filled three terminal device with one terminal being connected to ground and each of the other terminals being connected to one of said two terminals of said second terminal means.

10. A network interface module according to claim 6 wherein said overvoltage protection means includes a first, a second and a third SIDAC, said first and second SIDAC's being serially connected with one electrode of said first SIDAC being connected to one terminal of said second terminal means, one electrode of said second SIDAC being connected to the other terminal of said second terminal means, the juncture of the other of said SIDAC electrodes being connected to one electrode of said third SIDAC the other terminal of said third SIDAC being connected to a ground terminal.

11. A network interface module for providing connections between a customer's equipment and the telephone company owned portion of a customer loop comprising:

A. an elongated hollow housing having;
  a) a closed top surface having a socket means disposed thereon and an open bottom, and
  b) first terminal means removably received at one end of said top surface adapted to be connected to said customer's equipment, and
  c) cable means having a plug means disposed on one end thereof, the other end of said cable means being connected to said first terminal means, said cable plug means being adapted to be received into and cooperate with said housing socket means;
B. second terminal means having at least two terminals disposed at the opposite end of said top surface adapted to be connected to said telephone company owned portion of said customer loop;
C. overvoltage protection means disposed within said housing, said protection means having one terminal connected to a ground means and one terminal connected to each of said two terminals of said telephone company owned portion of said customer loop; and
D. circuit board means disposed within said housing, said circuit board means being adapted to be connected to said housing socket means and said second terminal means, said circuit board means further including line termination impedance means disposed on said circuit board means, said line termination means including:
  a) a series current path comprising,
    i) a resistor having one end thereof connected to one terminal of said second terminal means,
    ii) a first zener diode having a cathode and an anode said cathode being connected to the other end of said resistor,
    iii) a second zener diode having an anode and a cathode, said cathode being connected to the other terminal of said second terminal means, and
    iv) a capacitor, said capacitor having one end connected to the anode of said first zener diode and the other end being connected to the anode of said second zener diode.

* * * * *